United States Patent [19]

Maney et al.

[11] Patent Number: 4,614,971
[45] Date of Patent: Sep. 30, 1986

[54] ERROR ELIMINATING SYSTEM FOR TELETEXT

[75] Inventors: George A. Maney, Marina Del Rey, Calif.; Theodore S. Rzeszewski, Lombard, Ill.

[73] Assignee: Matsushita Electric Industrial Co., Ltd., Kadoma, Japan

[21] Appl. No.: 455,658

[22] Filed: Jan. 5, 1983

[51] Int. Cl.⁴ .................. H04N 7/087; H04N 7/08
[52] U.S. Cl. ........................... 358/147; 358/146; 358/167
[58] Field of Search ............ 358/147, 167, 142, 146, 358/36; 340/708, 798, 799

[56] References Cited

U.S. PATENT DOCUMENTS 4,052,719 10/1977 Hutt et al. ............................ 358/147
4,202,012  5/1980 Hirashima ............................ 358/147

OTHER PUBLICATIONS

"Wireless World Teletext Decoder", by J. F. Daniels, printed in Wireless World, Feb. 1976, pp. 46-51.

Primary Examiner—James J. Groody
Assistant Examiner—Michael D. Parker
Attorney, Agent, or Firm—Amster, Rothstein & Ebenstein

[57] ABSTRACT

A system is disclosed for eliminating error in teletext signals caused by the presence of noise accompanying the teletext signals. The system includes: (1) a teletext packet buffer which receives the teletext signal and transfers the teletext signals to a teletext decoder in the absence of noise accompanying the teletext signals; (2) a timing circuit which produces timing signals from television synchronous signals; (3) a control circuit which controls the teletext packet buffer in response to the timing signals; and (4) a noise detector which detects whether noise is present in the teletext signal and disables the teletext packet buffer to prevent the transfer of the teletext signal from the teletext packet buffer to the teletext decoder if the teletext signal was received in the presence of noise.

19 Claims, 12 Drawing Figures

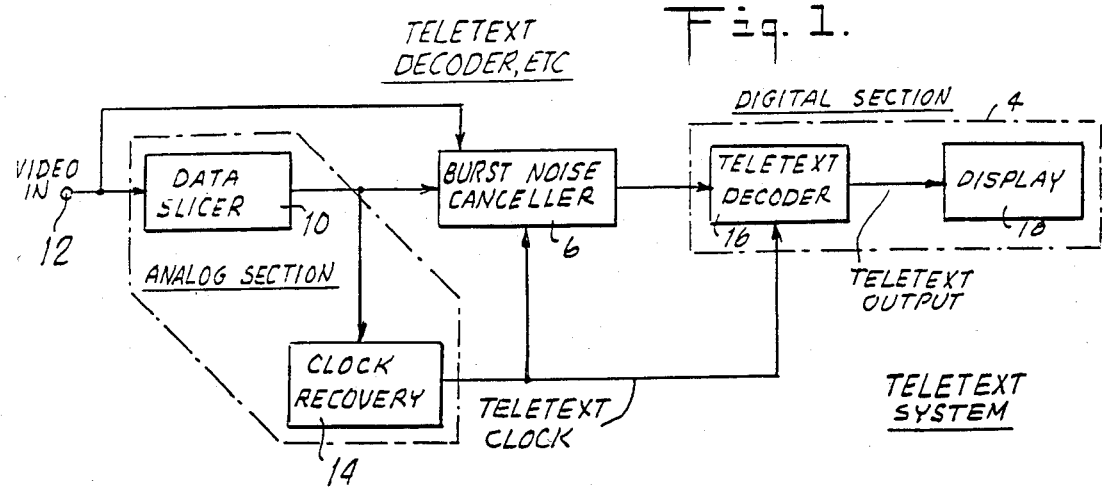
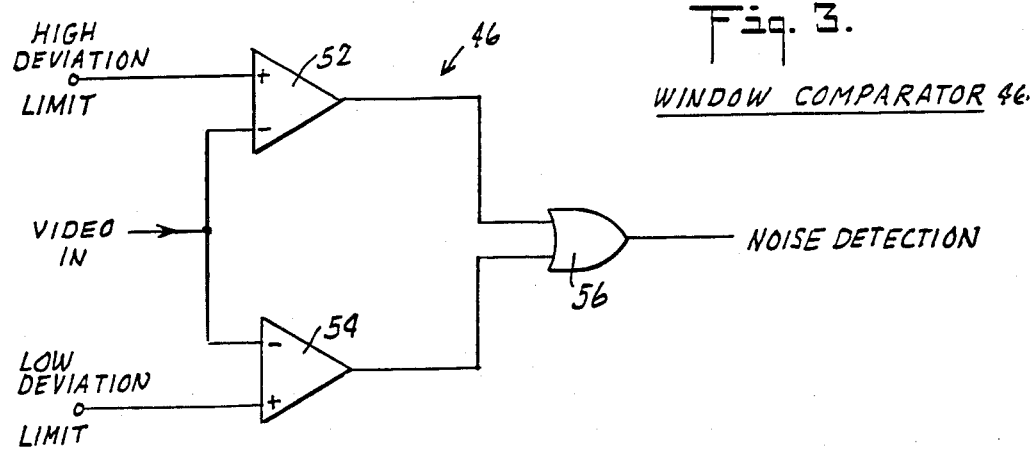
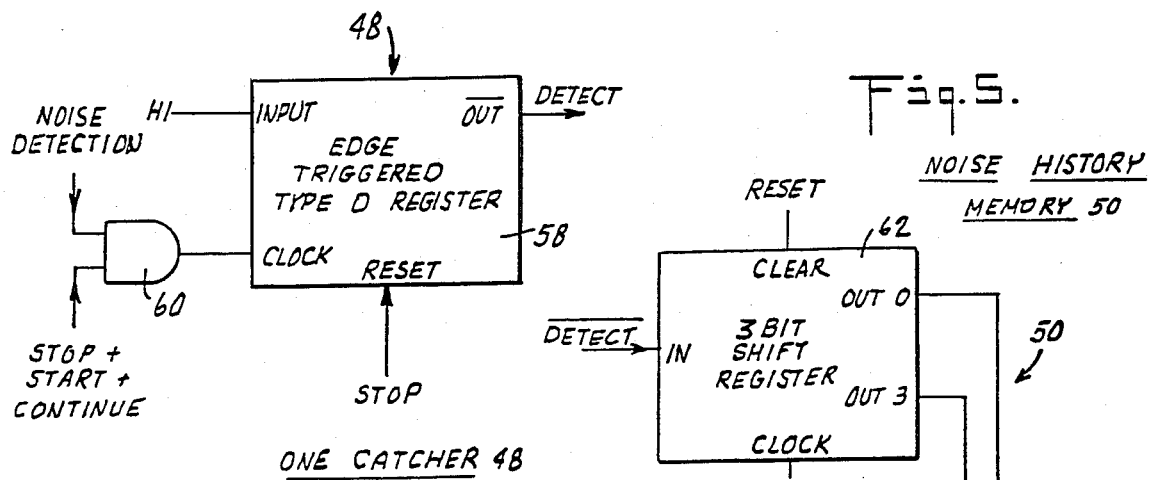
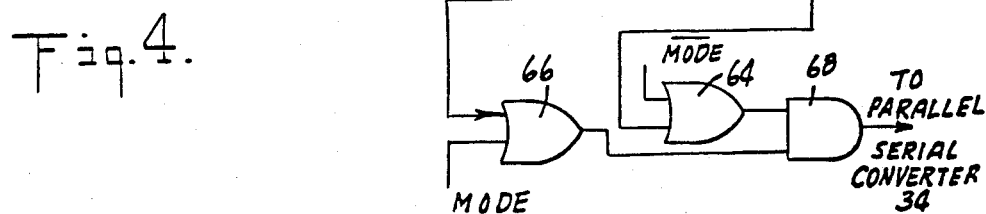

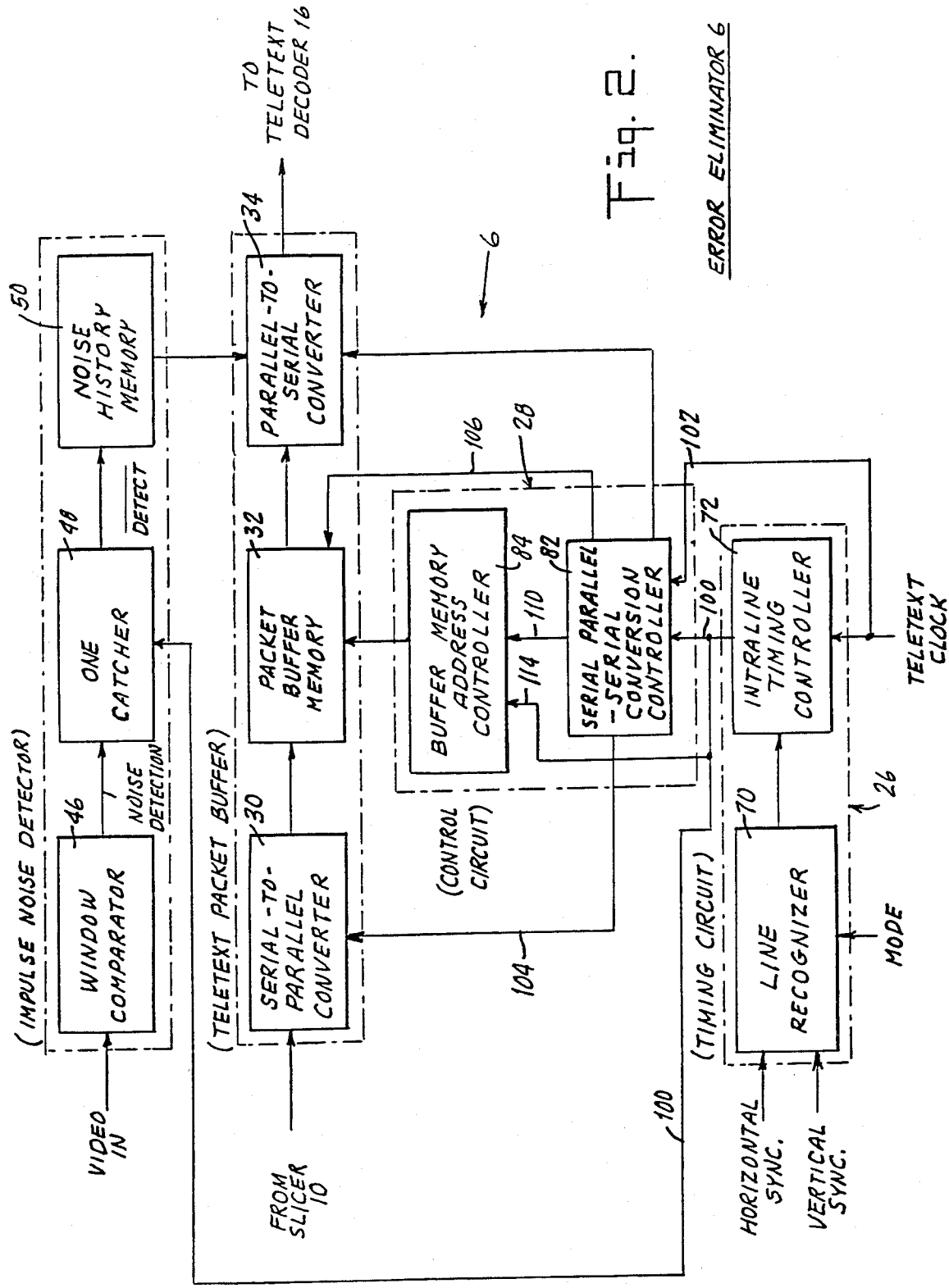

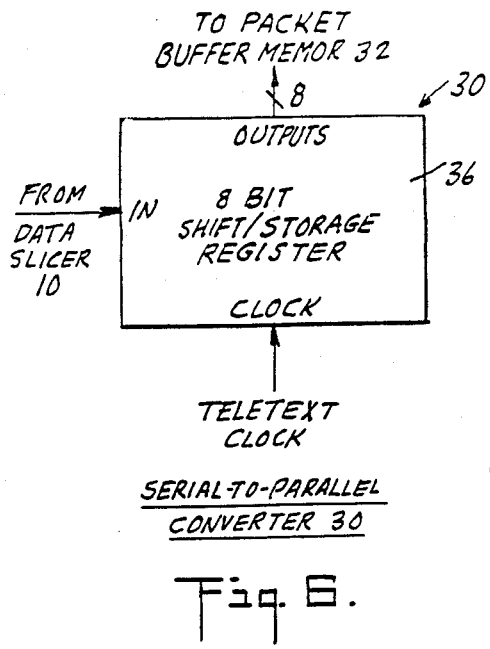
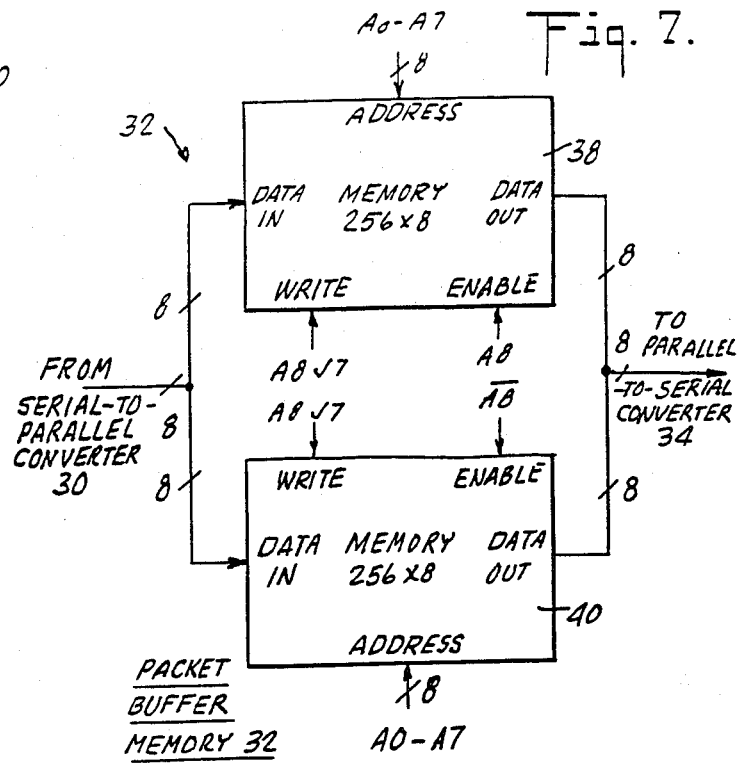
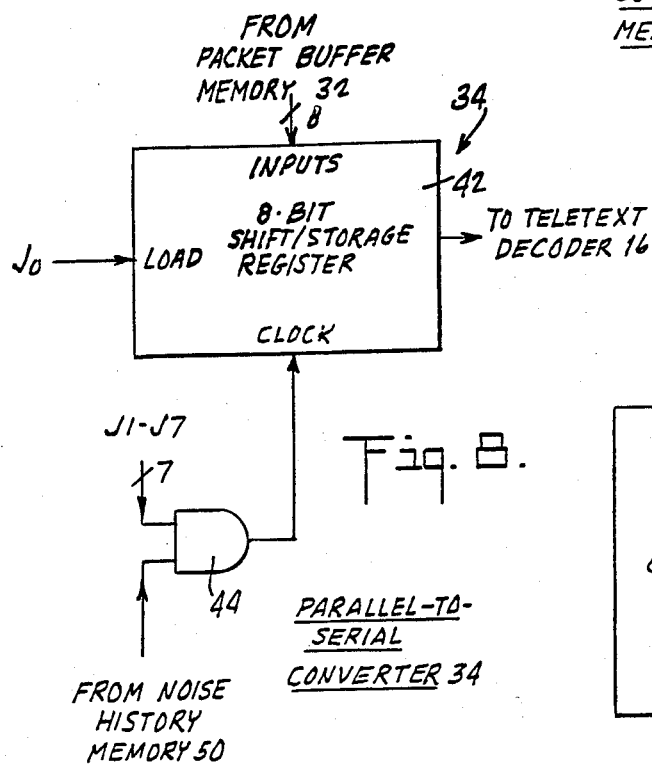
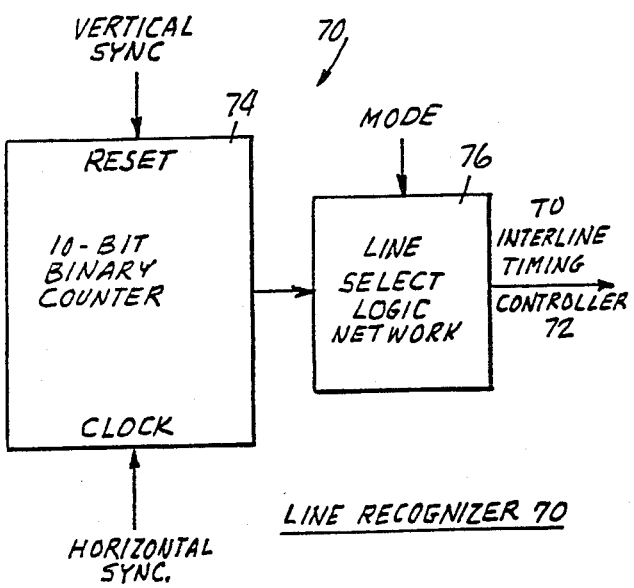

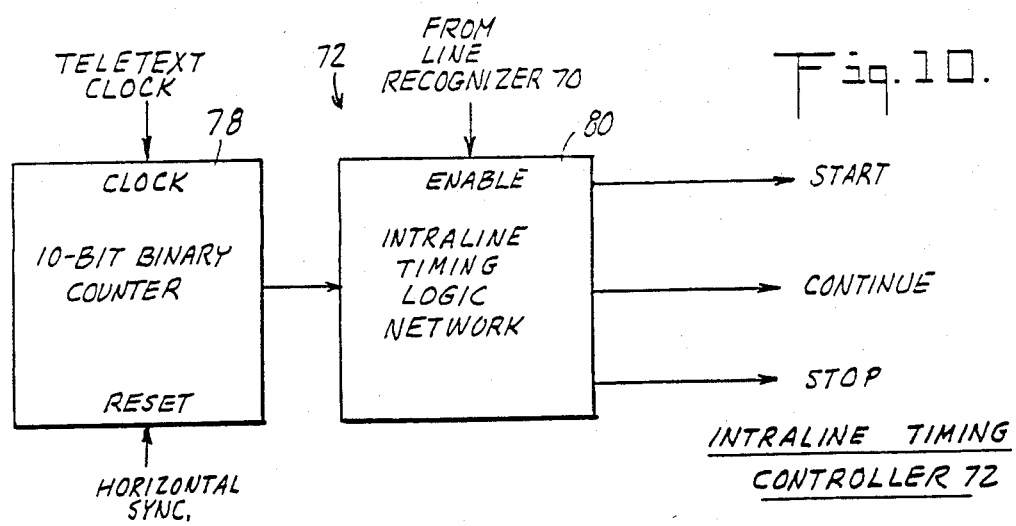
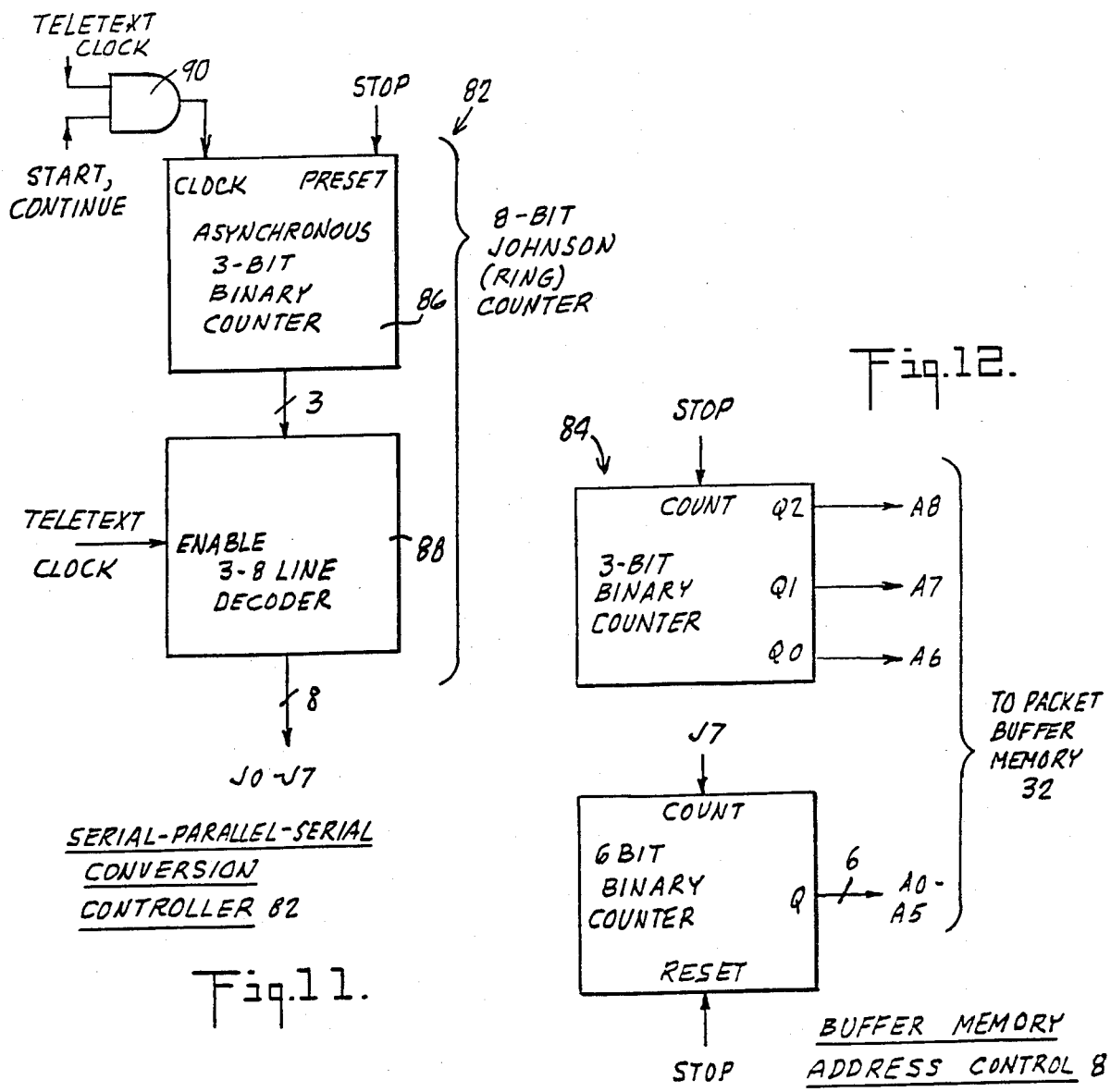

4,614,971

ERROR ELIMINATING SYSTEM FOR TELETEXT

DESCRIPTION OF THE INVENTION

The present invention relates to an error eliminating system for teletext which is able to eliminate the effects of noise-related errors in teletext decoding, and more particularly relates to an error eliminating system which is well suited to eliminate burst and multiburst teletext packet data errors resulting from electrical impulse noises.

Teletext is an information service that provides television viewers with textual and graphic information such as news, weather forecasts, traffic information and stock market conditions. A teletext transmission may share a television channel with a conventional television broadcast or may occupy a dedicated channel. The teletext signals are multiplexed into a conventional television video signal using one or more scanning lines per field. In vertical interval teletext, the teletext signals are included in the vertical blanking interval (VBL) of a standard broadcast television transmission signal. In full field teletext, in which an entire television channel is dedicated to a teletext transmission, most or all of horizontal scanning intervals contain teletext signals. With either system, the teletext information is displayed on a television screen by means of a decoder attached to or assembled in a home television receiver. The teletext signal comprises a plurality of packets of bit-serial synchronous NRZ (Non-Return To Zero) coded digital data. Each teletext packet is multiplexed into a single horizontal scanning interval and occupies a fixed position in the horizontal scanning interval. A single teletext picture (page) may be encoded in several teletext packets. Packets forming a single page may be transmitted as a group in packet serial order or interleaved with packets from other pages.

A teletext signal may be distorted by electrical noises during transmission, which noises give rise to data errors in the received teletext packets, resulting in a variety of errors in the displayed teletext page if teletext data packets containing these data errors are decoded. One common form of eletrical noises is impulse noise which is characterized by high intensity and short duration. Impulse noise may or may not be periodic and usually results from natural phenomena such as lightning, or from man-made causes such as radiated electromagnetic waves from radar sites or electrical power substations.

Impulse noise usually results in a single multibit or multicharacter error in a packet, known as a burst error. However, more than one burst error can occur in a single packet due to impulse noise. These burst errors resulting from impulse noise severely limit the usefulness of conventional error correction coding techniques in verifying teletext packet data integrity. Conventional error correction coding techniques have been used mainly in digital transmission systems. In these techniques, error check codes, such as parity check codes and cyclic redundancy check codes, are added to the encoded data information. Decoded error check codes are used for checking the presence or absence of transmission error in the received data. Audio impulse noise reduction systems have also been used for many years, mainly in communication-type receivers. These systems use a window comparator disposed after a detection stage to detect the presence of unusually strong signals. When such a strong signal is detected, the input signal level to the audio circuitry is clamped to a predetermined fixed level. These techniques are not directly applicable to teletext systems since an impulse noise occuring at any point in the teletext packets compromises the integrity of the entire packet.

The present invention, therefore, has as its principal object the provision of an error eliminator for teletext which identifies data likely to contain errors and prevents the identified error-containing data from being decoded.

More particularly, it is an object of the invention to provide an error eliminator which responds to the occurence of noise during any portion of an entire packet of teletext signal and which rejects the entire packet of teletext signal upon detection of such noise.

It is another object of the invention to provide an error eliminator for teletext signals which is more economical to construct and simpler to operate.

It is a further object of the invention to provide an error eliminator whose operation is based upon detection of impulse noise interference in the teletext system rather than in the detection of data errors in the transmitted data information.

These other objects are accomplished in accordance with the invention by an error eliminator in which packets of teletext signals and the television video signals are processed in parallel to determine whether the video signal contains an excessive amount of noise by monitoring the video signal level to determine whether the video signal level falls into a predetermined signal level range. If the video signal falls into that predetermined signal level range, the packet of teletext signal is considered to be free of impulse noise and is processed for display on the television receiver. If the video signal level falls outside the range, it is considered that the video signal has been affected by impulse noise possibly causing error in the teletext packet. The teletext decoder is then disabled to prevent the possible error-containing teletext packet from being displayed on the receiver.

In one embodiment of the error eliminator, a teletext packet buffer receives the video signal containing the teletext packets and stores the teletext packet for a predetermined time period. If impulse noise was not detected during the time that the teletext packet was being received in the teletext packet buffer, the teletext packet buffer transfers the teletext packet to the teletext decoder for display. If impulse noise was detected during the time that the teletext packet was being received in the teletext packet buffer, the teletext packet buffer is disabled and the teletext packet containing the noise is discarded. The error eliminator specifically includes a timing circuit for producing timing signals from television synchronous signals, a control circuit responsive to the timing signals for controlling the teletext packet buffer, and a noise detector responsive to the teletext signals for detecting whether noise is present in the video signal and for disabling the teletext packet buffer when noise is present in the video signals to prevent the transfer of the teletext signals from the teletext packet buffer to the teletext decoder when noise is present in the video signals.

In a more particular embodiment of the error eliminator, the teletext packet buffer includes a serial-to-parallel converter coupled to receive the serially arranged teletext data for converting that data into parallel output data, a packet buffer memory coupled to receive the output data from the serial-to-parallel converter for storing the data, the stored data being read out from the packet buffer memory in response to a control signal produced by the control circuit, and a parallel-to-serial converter coupled to receive the output data of the packet buffer memory for converting the parallel data into serial data. The timing circuit includes an intrafield timing circuit coupled to receive the television synchronous signals for detecting which lines in a field contain teletext packets, and an intraline timing circuit coupled to the intrafield timing circuit for detecting where in the detected packet containing line the teletext packet is located and for producing timing signals to be applied to the control circuit. The control circuit includes a serial-parallel-serial conversion controller coupled to receive the timing signals from the timing circuit, and a buffer memory address controller coupled to said serial-parallel-serial conversion controller for producing control signals which control the storage operation of the teletext packet buffer. The noise detector includes a window comparator coupled to receive a television video signal for detecting whether the level of the video signal falls in a predetermined level range, and one catcher coupled to said window comparator for setting the output to "1" when the level of the video signal is outside of the predetermined level range, and a noise history memory coupled at its input to the one catcher and at its output to said teletext packet buffer for storing the output of the one catcher and for producing a control signal to disable the read-out operation of the teletext packet buffer circuit when the window comparator detects a level outside of the predetermined level range.

While the novel features of the invention are set forth with particularly in the appended claims, the invention, both as to organization and content, will be better understood and appreciated, along with other objects and features thereof, from the following detailed description taken in conjunction with the drawing, in which:

FIG. 1 is a schematic block diagram of a teletext system including an error eliminator embodying the present invention;

FIG. 2 is a schematic block diagram of the error eliminator of the embodiment of the invention;

FIGS. 3-12 are schematic and block diagrams showing various portions of the error eliminator, as follows:

FIG. 3 shows a window comparator;
FIG. 4 shows a one catcher;
FIG. 5 shows a burst history memory;
FIG. 6 shows a serial-to-parallel converter;
FIG. 7 shows a packet buffer memory;
FIG. 8 shows a parallel-to-serial converter;
FIG. 9 shows a line recognizer;
FIG. 10 shows an intraline timing controller;
FIG. 11 shows a serial-parallel-serial conversion controller; and
FIG. 12 shows a buffer memory address controller.

Referring to FIG. 1, there is shown a teletext system including an error eliminator constructed in accordance with the features of the present invention. The teletext system comprises three sections: an analog section 2, a digital section 4 and an error eliminator 6. The analog section 2 includes a data slicer 10 for waveform shaping of a television video signal including a teletext signal which is fed through video input terminal 12 and clock recovery circuit 14 for reproducing teletext clock pulses from the output teletext signals of data slicer 10. The teletext clock, typically in the 4-7 MHz range, is locked to some fractional harmonic of a color subcarrier frequency (3.58 MHz) and is thus in a constant phase relation with the horizontal and vertical synchronous signals of the television signal. Digital section 4 decodes the received teletext signals in teletext decoder 16 and displays the decoded signals on the display of a standard television receiver 18. The error eliminator 6 eliminates error in the teletext signal caused by the presence of noise. The error eliminator 6 is connected between the output of analog section 2 and the input of digital section 4.

In operation, waveforms of incoming television video signals at terminal 12 are shaped by data slicer 10, which slicer produces an output signal (shaped video signal) which is applied to error eliminator 6. The error eliminator 6 stores packets of the teletext signal as the packets arrive from analog section 2 and retransmits the stored packets to digital section 4 after a predetermined time delay, for example, one field (in case of vertical interval teletext) or one line (in case of full field teletext) if no impulse noise is detected during the time that the entire packet was being received. If impulse noise is detected by error eliminator 6 during the time that a packet is being received, that packet including the noise component is discarded and not retransmitted to digital section 4. The teletext packets which are transmitted by error eliminator 6 are demodulated by teletext decoder 16 and the demodulated signal (color signal or RF video signal) is displayed on a television screen or display without the ordinary television broadcast picture or superimposed on the television broadcast picture.

The structure of error eliminator 6 will now be described in detail with reference to FIG. 2. Error eliminator 6 comprises the following four main components:
1. Teletext packet buffer 22.
2. Impulse noise detector 24.
3. Timing circuit 26.
4. Control circuit 28.

Teletext packet buffer 22 receives a shaped video signal including the teletext packets from data slicer 10 and transfers the teletext packets to teletext decoder 16 in the absence of noise accompanying the teletext signal. Impulse noise detector 24 detects whether impulse noise is present in the video signal including the teletext packets and disables teletext packet buffer 22 when noise is present in the video signal to prevent the transfer of the noise-containing teletext packet from teletext packet buffer 22 to teletext decoder 16. Timing circuit 26 produces timing signals from the horizontal and vertical synchronous signals of the television signal to control the operation of error eliminator 6. Control circuit 28 controls teletext packet buffer 22 in response to the timing signals from timing circuit 26.

Each component of error eliminator 6 will now be explained in more detail. Teletext packet buffer 22 comprises serial-to-parallel converter 30, packet buffer memory 32 and parallel-to-serial converter 34. Serially arranged teletext packets from data slicer 10 are broken up into contiguous 8-bit segments each of which typically constitutes one character of teletext data. The 8-bit segments are converted into 8-bit parallel segments by serial-to-parallel converter 30. The parallel output signal of serial-to-parallel converter 30 is stored in packet buffer memory 32 for a predetermined period of time. The stored teletext packet is then read out from packet buffer memory 32 after the elapse of the predetermined period of time and applied to parallel-to-serial converter 34 where the parallel-data segment is converted into a serial-data segment which, in turn, is applied to teletext decoder 16 to be demodulated.

Serial-to-parallel converter 30, as shown in detail in FIG. 6, comprises an 8-bit shift/storage register 36. Serially arranged teletext packets from data slicer 10 are supplied to the input of 8-bit shift/storage register 36. The input teletext packets are stored in register 36 as 8-bit segments. The stored 8-bit segments are read out from the eight output terminals of register 36 as a parallel teletext signal and are supplied to packet buffer memory 32. The operation of register 36 is controlled by clock signals from control circuit 28.

Packet buffer memory 32, as shown in FIG. 7, comprises two identical memories 38, 40 having a capacity, for example, of 256×8 bits. The two memories 38, 40 are connected to each other by input, output and memory buses. A segment of a stored packet is read out from one memory at the same time as a segment of an incoming packet is being stored at the same address position in the other memory. These read and write operations of packet buffer memory 32 are controlled by control signals J7, A0–A8 (FIG. 11, 12) from serial-parallel-serial conversion controller 82 and buffer memory address controller 84 of control circuit 28. The total capacity of packet buffer memory 32 is, for example, eight packets (one packet is no more than 512 (256×2) bits) which is sufficient for a four-line vertical interval teletext system. Packet buffer memory 32 has eight inputs and eight outputs to handle the eight output signals of serial-to-parallel converter 30 simultaneously. Of course, the memory capacity of packet buffer memory 32 can be expanded to store additional packets of information.

Parallel-to-serial converter 34, as shown in FIG. 8, comprises 8-bit shift/storage register 42. Eight parallel output signals from packet buffer memory 32 are supplied to the inputs of 8-bit shift/storage register 42. The input parallel signals are converted into a serial signal, which is supplied to teletext decoder 16. The operation of register 42 is controlled by a control signal J0 (FIG. 11) from parallel-serial-parallel conversion controller 82 of control circuit 28 and a clock signal from AND gate 44. AND gate 44 receives two kinds of input signals, output signals J1–J7 (FIG. 11) from serial-parallel-serial conversion controller 82 of control circuit 28 and the output signal from noise history memory 50 of impulse noise detector 24, and produces clock signals which are supplied to 8-bit shift/storage register 42. AND gate 44 is opened to transfer the output signal J1–J7 of conversion controller 82 to register 42 as clock signals only when the output signals of noise history memory 50 of impulse noise detector 24 (FIG. 2) is not supplied to one input of AND gate 44 (when impulse noise detector 24 does not detect the presence of noise in the teletext signal). Therefore, register 42 produces the output signals which are supplied to teletext decoder 16 unless noise is present in the teletext signal and the register 42 produces no output signal if noise is present in the teletext signal. The output signal J0 of serial-parallel-serial conversion controller 82 (FIG. 11) of control circuit 28 is used as a load signal which occurs every eighth operation of 8-bit shift/storage register 42.

Returning to FIG. 2, impulse noise detector 24 comprises window comparator 46, one catcher 48 and a noise history memory 50. The incoming video signal is monitored by the window comparator 46 which determines whether the level of the incoming video signal falls in the predetermined fixed level range. If window comparator 46 determines that the level of the video signal is outside of the level range (noise is included in the incoming video signal), window comparator 46 produces its output signal and the output of one catcher 48 is set to "1", which output "1" is stored in noise history memory 50. The above-mentioned detection and storage operations are carried out successively until an entire teletext packet has been stored in packet buffer memory 32. If noise is detected during the time when a packet is received, it is presumed that the packet is damaged and therefore contains errors, and the output of noise history memory 50 disables the parallel-to-serial converter 34 and effectively discards the presumably damaged packet.

Window comparator 46, as shown in FIG. 3, comprises first comparator 52 which compares the video signal with a first reference voltage representative of high deviation limit and produces an output signal when the video signal exceeds the first reference voltage, second comparator 54 which compares the video signal with a second reference voltage representative of low deviation limit and produces an output signal when the video signal is lower than the second reference voltage, and OR gate 56 which produces an output signal as a noise detection signal only when at least one of output signals of comparators 52, 54 is received by OR gate 56 (when the level of the incoming video signal is outside of the predetermined level range).

One catcher 48, as shown in FIG. 4, comprises edge-triggered one-bit D-type register 58. The output signal of window comparator 46 is supplied to a clock terminal of register 58 through AND gate 60. AND gate 60 receives the output signal (noise detection signal) of window comparator 46 and the output signals (stop, start, continue signals) of intraline timing controller 72 (FIG. 10) of timing circuit 26. Since the input terminal of register 58 is connected to fixed high voltage HI, register 58 is set by the clock signal from AND gate 60. When window comparator 46 detects that the level of the incoming video signal is outside of the predetermined fixed level range (impulse noise is included in the video signal), and produces its output signal, AND gate 60 is opened by the output noise detection signal of window comparator 46 during the time that the output signal of window comparator 46 is present to open AND gate 60 to transfer the output signals (stop, start, continue signals) of intraline timing controller 72 of timing circuit 26 to the register 58 as clock signals. Then, register 58 is set to "1" when receiving a clock signal and produces "1" signal from its output as the DETECT signal. Register 58 is reset by a control signal (stop signal) from intraline timing controller 72 (FIG. 10) to change the "1" signal to "0" signal.

Noise history memory 50, as shown in FIG. 5, comprises 3-bit shift register 62. Register 62 receives the output signal (DETECT signal) from one catcher 48 at its input and stores the output of one catcher 48. When an entire teletext packet has been stored in packet buffer memory 32, register 62 is controlled by a clock signal to produce its output signals, which signals are processed by OR gates 64, 66 and AND gate 68. When register 62 stores the "1" signal until the time that one entire packet has been stored in packet buffer memory 32, AND gate 68 produces an output signal which is supplied to AND gate 44 of parallel-to-serial converter 34 (FIG. 8) to prevent the operation of converter 34.

Referring to FIG. 2, timing circuit 26 comprises intrafield timing circuit 70 and intraline timing circuit 72. Intrafield timing circuit 70, which essentially is a line recognizer, determines which lines in a field contain teletext packets in response to the horizontal and vertical synchronous signals of the television signal. Intraline timing circuit 72, which is responsive to the output signal of intrafield timing circuit 70, determines where in the selected package containing line the teletext packet is present. The output signals of intraline timing circuit 72 are used as timing signals for the operation of error eliminator 6.

Intrafield timing circuit 70, as shown in FIG. 9, comprises a 10-bit binary counter 74 and line select logic network 76. The 10-bit binary counter 74 counts the horizontal synchronous signal of the television signal and is reset by the vertical synchronous signal of the television signal and produces the output signals representative of line numbers in one field. Line select logic network 76 receives the output signals of 10-bit binary counter 74 and produces the output signals representative of the number of lines, which lines contain teletext packets, and enables intraline timing on lines used for teletext packets. The line selection operation of line select logic network 76 is controlled by the MODE signal. For example, in vertical interval teletext mode, part of the lines of one field are selected as lines which include teletext packets. In the full field teletext mode, most or all of the lines of one field are selected as lines including teletext packets. This change of selection operation is carried out automatically by change of the MODE signal. The design of logic network 76 depends upon the timing specification of the teletext standard with which this error eliminator 6 will be used, as would be well known to a skilled worker. The output signal of line select logic network 76 is supplied to intraline timing controller 72.

Intraline timing controller 72, as shown in FIG. 10, comprises a 10-bit binary counter 78 and intraline timing logic network 80. The 10-bit binary counter 78 counts teletext clock pulses from clock recovery circuit 14 (FIG. 1) and is reset by the horizontal synchronous signal of the television signal and produces the output signals representative of data-segment number in one line. Intraline timing logic network 80 receives the output signals of 10-bit binary counter 78 and the output signals of line recognizer 70, and produces three kinds of output signals: start; stop; and continue signals. The start signal indicates the start point of a teletext packet in one line and the stop signal indicates the end of a teletext packet in one line. The continue signal indicates the duration in which a teletext packet is included. These output signals are used as timing signals for the operation of error eliminator 6. The particular design of logic network 80 depends on timing specifications of the teletext standard with which this error eliminator 6 will be used. The teletext standards are well known and the particular design of the logic network to meet these standards could be implemented using conventional logic design.

Referring to FIG. 2, control circuit 28 comprises serial-parallel-serial conversion controller 82 and buffer memory address controller 84. Serial-parallel-serial conversion controller 82 receives the timing signals from timing circuit 26 and produces the 8-bit output signals J0-J7 (FIG. 11) which signals are supplied to serial-to-parallel converter 30, packet buffer memory 32 and parallel-to-serial converter 34. The output signals of conversion controller 82 are used as clock signals of converters 30, 34 and as write signals of packet buffer memory 32. Therefore, the conversion operations of converters 30, 34 and the storage/read-out operation of memory 32 are carried out synchronously. Buffer memory address controller 84 receives the output signal of conversion controller 82 and produces the output signals which are supplied to packet buffer memory 32 to keep track of where in packet buffer memory 32 each segment of teletext packet is stored.

Serial-parallel-serial conversion controller 82, as shown in FIG. 11, comprises an 8-bit Johnson (ring) counter which counts the teletext clock pulses. The Johnson counter includes an asynchronous 3-bit binary counter 86 and 3-bit-to-8-bit line decoder 88. 3-bit binary counter 86 receives the teletext clock pulses from clock recovery circuit 14 (FIG. 1) through AND gate 90. This AND gate 90 is opened to transfer the teletext clock pulses to binary counter 86 when the start and continue signals of intraline timing controller 72 are supplied to one input of AND gate 90. Binary counter 86 counts the teletext clock pulses and produces 3-bit output signals, and is reset by the stop signal of intraline timing controller 72. The 3-bit output signals of binary counter 86 are supplied to 3-bit-to-8-bit line decoder 88 and converted into 8-bit signals J0-J7 which are supplied to teletext packet buffer 22 as stated above. The teletext clock pulses are also supplied to line decoder 88 as enabling signals which enable the operation of line decoder 88.

Buffer memory address controller 84, as shown in FIG. 12, comprises a 3-bit binary counter 92 and a 6-bit binary counter 94. 3-bit binary counter 92 counts the stop signal which is produced from the intraline timing controller 72 and produces output signals A6-A8 which are supplied to packet buffer memory 32. 3-bit binary counter 92 controls which of the four teletext pages stored in packet buffer memory 32 is currently selected and which of two memories 38, 40 of packet buffer memory 32 carries out the read-out operation or write operation. The 6-bit binary counter 94 counts the output signal J7 of serial-parallel-serial conversion controller 82 and thereby detects the number of serial-parallel-serial conversion operations and produces the output signals A0-A5 which are supplied to packet buffer memory 32 to control the address position of teletext segments in a current page of packet buffer memory 32.

The entire error eliminator 6 can be implemented in a single MOS digital integrated circuit (IC) with the exception of the window comparator which can be implemented using a standard dual comparator IC or integrated into the analog portion of a teletext decoder IC chip set.

The overall operation of the error eliminator 6 will now be described. Referring to FIG. 2, timing circuit 26 produces timing signals on line 100 for starting, stopping and continuing the operations of the error eliminator 6. These timing signals are produced from the horizontal and vertical synchronous signals generated in a television receiver circuit (not shown) and the teletext clock pulses produced by the clock recovery circuit 14 (FIG. 1). Control circuit 28, which receives the timing signals from timing circuit 26 and teletext clock pulses from clock recovery circuit 14 via line 102, synchronizes the operation of teletext packet buffer 22 by providing control signals from serial-parallel-serial conversion controller 82 to serial-to-parallel converter 30, packet buffer memory 32 and parallel-to-serial converter 34 via lines 104, 106 and 108 respectively. Serial-parallel-serial conversion controller 82 also provides an increment signal J7 (FIG. 11) on line 110 to buffer memory address controller 84, which controller 84 in turn produces address, write and enable signals on line 112 from the increment signal J7 on line 110 and the stop timing signal on line 114 from timing circuit 26. The signals on line 112 are supplied to packet buffer memory 32 to control the storage position of data in packet buffer memory 32 and storage, read-out operations of the memory 32.

The synchronized operation of serial-to-parallel converter 30, packet buffer memory 32 and parallel-to-serial converter 34 will now be described in more detail. By the control signal on line 104 from the conversion controller 82, serial-to-parallel converter 30 receives the output signal of data slicer 10 and converts the signal into parallel data of 8-bit units. The parallel data units are then stored in one of two memories 38, 40 of packet buffer memory 32. This storage operation is controlled by the control signals on lines 106, 112. The serial-to-parallel conversion operation of the converter 30 and the storage operation in one memory of packet buffer memory 32 are carried out at substantially the same time. At the same time as the storage operation in one memory of packet buffer memory 32, the previously stored data in the other memory of packet buffer memory 32 is read out and transferred to parallel-to-serial converter 34. Therefore, the output signal of serial-to-parallel converter 30 is transferred to parallel-to-serial converter 34 with a predetermined time delay set by packet buffer memory 32 such as one field (in case of vertical interval telecast mode) or one line (in case of full field teletext mode), as stated above. If there is no noise present in the video signal during the time that a teletext packet is being received by the teletext packet buffer 22, the corresponding stored teletext packet is converted into serial data by parallel-to-serial converter 34, which serial data is then transferred to teletext decoder 16. However, if there is noise present in the video signal during the time that a teletext packet is being received by the teletext packet buffer 22, parallel-to-serial converter 34 is disabled from converting the corresponding stored data into serial form. Therefore, the teletext packet including the error caused by noise is discarded and not demodulated by the teletext decoder 16. The parallel-to-serial conversion operation of the converter 30 and the storage operation in one memory of packet buffer memory 32 are carried out at the same time as the read-out operation of previously stored data in the other memory of packet buffer memory 32 and the parallel-to-serial conversion operation of the read-out data by the converter 34 under the control of control circuit 28.

Noise is detected by impulse noise detector 24. A video signal from input terminal 12 (FIG. 1) designated VIDEO IN is transferred to window comparator 46, which comparator 46 detects whether the incoming video signal is within a predetermined level range. If the video signal is outside of the predetermined level range, it means that the video signal, including the teletext signal in the video signal, contains impulse noise. In this latter case, window comparator 46 produces an output signal as a noise detection signal and, by this output signal, the output of one catcher 48 is set to "1", which is then stored in noise history memory 50. These detection and storage operations are continued during the time that an entire teletext packet is received and thereafter, noise history memory 50 produces the disabling signal to parallel-to-serial converter 34 in the case of noise occurence. Then, when the data including the error caused by noise is supplied from packet buffer memory 32 to parallel-to-serial converter 34, the converter 34 does not operate to convert the data into serial data.

While there have been described what are at present considered to be the preferred embodiments of the invention, it will be understood that various modifications can be made. For example, the error eliminator can be constructed with a single MOS digital IC. It is intended that the appended claims cover all modifications as fall within the true spirit and scope of the invention.

What is claimed is:

1. A system for eliminating error in teletext signals caused by the presence of noise accompanying the teletext signals, the teletext signals accompanying television signals which include television video signals and television synchronous signals, the system comprising:
   a teletext packet buffer for receiving the teletext signals and outputting received teletext signals;
   a timing circuit for producing timing signals from the television synchronous signals;
   a control circuit responsive to the timing signals for controlling the teletext packet buffer including causing it to output teletext signals; and
   a noise detector coupled to receive the television video signals for detecting the presence of noise in the accompanying teletext signals and for preventing teletext signals which were received by the teletext packet buffer in the presence of noise as detected by the noise detector to be output from the teletext packet buffer.

2. The system of claim 1 wherein the teletext packet buffer includes means for storing one or more packets of teletext signals, the control circuit controlling the time that each packet is stored in the teletext packet buffer to cause each packet to be stored in the teletext packet buffer for a predetermined time.

3. The system of claim 1 wherein the teletext packet buffer includes a serial-to-parallel converter coupled to receive teletext signals and for converting serial teletext signals into parallel teletext signals, a packet buffer memory coupled to receive parallel teletext signals from the serial-to-parallel converter and store the parallel teletext signals, the control circuit controlling the time that parallel teletext signals are stored in the packet buffer memory and causing the stored parallel teletext signals to be read out from the packet buffer memory after a predetermined time, and a parallel-to-serial converter coupled to receive the parallel teletext signals read from packet buffer memory for converting the parallel teletext signals back into serial teletext signals.

4. The system of claim 3 wherein the noise detector is coupled to the parallel-to-serial converter and prevents it from outputting teletext signals received in the presence of noise.

5. The system of claim 3 wherein the timing circuit includes an intrafield timing circuit coupled to receive the television synchronous signals for detecting lines containing teletext data, and an intraline timing circuit coupled to the intrafield timing circuit for detecting where in a line the teletext data is located and for producing the timing signals to be applied to the control circuit which start, stop and continue the operation of the teletext packet buffer.

6. The system of claim 3 wherein the control circuit includes a serial-parallel-serial conversion coupled to receive the timing signals from the timing circuit for producing control signals which are applied to the serial-to-parallel converter and the parallel-to-serial converter, and a buffer memory address controller coupled to the serial-parallel-serial conversion controller for producing control signals which are applied to the packet buffer memory to control storage and read operations of the packet buffer memory.

7. The system of claim 1 including a teletext decoder coupled to the teletext packet buffer to receive teletext signals output therefrom and a television receiver including a display to which the teletext decoder is coupled for displaying teletext data on the display.

8. The system of claim 1 wherein the noise detector includes means coupled to receive the television video signals for detecting the presence of one or more signal conditions indicative of the presence of noise accompanying the teletext signals.

9. A system for eliminating error in teletext signals caused by the presence of noise accompanying the teletext signals, the teletext signals accompanying television signals which include television video signals and television synchronous signals, the system comprising:
- a teletext packet buffer including a packet buffer memory coupled to receive the teletext signals for storing one or more teletext packets of the teletext signals;
- a timing circuit for producing timing signals from the television synchronous signals, the timing signals being used for starting, stopping and continuing the operation of the system;
- a control circuit responsive to the timing signals for controlling the teletext packet buffer, the control circuit controlling the time that each teletext packet is stored in the packet buffer memory and causing each teletext packet to be output from the packet buffer memory after a predetermined time; and
- a noise detector coupled to receive the television video signals for detecting the presence of noise in the teletext signals and for preventing the teletext packet buffer from outputting after the predetermined time a teletext packet which was received by the teletext packet buffer in the presence of noise as detected by the noise detector.

10. The system of claim 9 including a teletext decoder coupled to the teletext packet buffer to receive teletext signals output therefrom and a television receiver including a display to which the teletext decoder is coupled for displaying teletext data on the display.

11. The system of claim 9 wherein the noise detector includes means coupled to receive the television video signals for detecting the presence of one or more signals conditions indicative of the presence of noise accompanying the teletext signals.

12. A system for eliminating error in teletext signals caused by the presence of noise accompanying the teletext signals, the teletext signals accompanying television signals which include television video signals and television synchronous signals, the system comprising:
- a teletext packet buffer for receiving the teletext signals and for outputting the teletext signals;
- a timing circuit for producing timing signals from the television synchronous signals;
- a control circuit responsive to the timing signals for controlling the teletext packet buffer including causing the teletext packet buffer to output the teletext signals it receives; and
- a noise detector responsive to the television video signals for detecting whether noise is present in the television video signals and for preventing the teletext packet buffer from outputting teletext signals from the teletext packet buffer which were received by the teletext packet buffer in the presence of noise, the noise detector including a window comparator responsive to the television video signals for detecting whether the level of the television video signals falls in a predetermined level range and for producing an output signal when the level of the television video signal is outside of the predetermined level range, and a noise history memory coupled to the window comparator for storing the output signal of the window comparator and producing a control signal coupled to the teletext packet buffer to prevent it from outputting teletext signals which were received by the teletext packet buffer at the time that the window comparator produces said output signal.

13. The system of claim 12 including a teletext decoder coupled to the teletext packet buffer to receive teletext signals output therefrom and a television receiver including a display to which the teletext decoder is coupled for displaying teletext data on the display.

14. A system for eliminating error in teletext signals caused by the presence of noise accompanying the teletext signals, comprising:
- a timing circuit for producing timing signals from television synchronous signals;
- storage means for receiving teletext signals, temporarily storing them and outputting them;
- a control circuit which is responsive to the timing signals and coupled to the storage means for controlling the outputting of the teletext signals from the storage means; and
- means responsive to the teletext signals for detecting whether noise is present in the teletext signals during the time that the teletext signals are being received by the storage means, the noise detecting means being coupled to the storage means and preventing teletext signals which were received by the storage means in the presence of noise as detected by the noise detecting means from being output from the storage means.

15. The system of claim 14 wherein the noise detector means includes means coupled to receive the teletext signals for detecting the presence of one or more signal conditions indicative of noise accompanying the teletext signals.

16. The system of claim 15 including a teletext decoder coupled to the teletext packet buffer to receive teletext signals output therefrom and a television receiver including a display to which the teletext decoder is coupled for displaying teletext data on the display.

17. A system for eliminating error in teletext signals accompanying television signals caused by the presence of noise accompanying the teletext signals, comprising:
- a buffer memory coupled to receive the teletext signals, store them and output them;
- a teletext decoder coupled to received teletext signals output by the buffer memory and decode them;
- control means including a timing circuit for producing timing signals derived from the television signals and for controlling the buffer memory including causing it to store and output teletext signals; and a noise detector detector responsive to the teletext signals and controlled by the control means for detecting whether noise is present in the teletext signals and for preventing teletext signals which were received by the buffer memory in the presence of noise as detected by the noise detector from being output from the buffer memory to the teletext decoder.

18. The system of claim 17 wherein the noise detector means includes means coupled to receive the teletext signals for detecting the presence of one or more signal conditions indicative of noise accompanying the teletext signals.

19. A system for elminating error in teletext signals caused by the presence of noise accompanying the teletext signals, the teletext signals accompanying television signals which include television video signals and television synchronous signals, the system comprising:

a teletext packet buffer for receiving the teletext signals and outputting them in the absence of noise accompanying their reception by the teletext packet buffer;

a timing circuit for producing timing signals from the television synchronous signals;

a control circuit responsive to the timing signals for controlling the teletext packet buffer including outputting by the teletext packet buffer of teletext signals; and a noise detector including a window comparator coupled to receive the television video signals for detecting whether the level of the television video signals falls in a predetermined level range, a one catcher coupled to the window comparator, the window comparator causing the output of the one catcher to change when the level of the television video signals is outside of the predetermined level range, and a noise history memory coupled at its input to the one catcher and at its output to the teletext packet buffer for storing the output of the one catcher and for producing a control signals which is coupled to the teletext packet buffer to prevent it from outputting teletext signals which were received by the teletext packet buffer when the window comparator caused the output of the one catcher to change.

* * * * *